US012455938B2

(12) United States Patent
Chen

(10) Patent No.: US 12,455,938 B2
(45) Date of Patent: Oct. 28, 2025

(54) KEYWORD MANAGEMENT SYSTEM

(71) Applicant: AVIVID INNOVATIVE MEDIA CO., LTD, Taipei (TW)

(72) Inventor: Meng Xiang Chen, Taipei (TW)

(73) Assignee: AVIVID INNOVATIVE MEDIA CO., LTD, Taipei (TW)

(*) Notice: Subject to any disclaimer, the term of this patent is extended or adjusted under 35 U.S.C. 154(b) by 525 days.

(21) Appl. No.: 17/951,142

(22) Filed: Sep. 23, 2022

(65) Prior Publication Data
US 2023/0107086 A1 Apr. 6, 2023

(30) Foreign Application Priority Data
Oct. 4, 2021 (TW) .................................. 110136920

(51) Int. Cl.
*G06F 16/00* (2019.01)
*G06F 3/0482* (2013.01)
*G06F 16/957* (2019.01)
*G06F 16/958* (2019.01)

(52) U.S. Cl.
CPC ........ *G06F 16/9577* (2019.01); *G06F 3/0482* (2013.01); *G06F 16/958* (2019.01)

(58) Field of Classification Search
CPC .............................. G06F 16/00; G06F 16/9577
See application file for complete search history.

(56) References Cited

U.S. PATENT DOCUMENTS

| | | | |
|---|---|---|---|
| 8,694,480 B2 * | 4/2014 | Henkin | G06F 16/9535 |
| | | | 707/705 |
| 9,117,006 B2 | 8/2015 | Zhu et al. | |
| 11,134,118 B2 * | 9/2021 | Liu | H04L 67/04 |
| 2007/0156757 A1 | 7/2007 | Tang et al. | |

FOREIGN PATENT DOCUMENTS

TW    I591495 B    7/2017

* cited by examiner

*Primary Examiner* — Cheryl Lewis
(74) *Attorney, Agent, or Firm* — Best & Flanagan LLP

(57) ABSTRACT

A keyword management system includes at least one user device and a server host. The user device is provided for inputting at least one web page information, at least one whitelist information and at least one blacklist information. The server host includes a word parsing module, a keyword database and a front-end module. The word parsing module captures a multiple of keyword data from the web page information. The keyword database is provided for storing the keyword data, and these keyword data are associated with the web page information and include a whitelist and a blacklist, and the whitelist and blacklist include a multiple of keyword data. The front-end module is provided for generating a web page according to the web page information, keyword data, whitelist and blacklist. Wherein, the keyword data included in the blacklist will not be displayed on the web page.

6 Claims, 3 Drawing Sheets

KEYWORD MANAGEMENT SYSTEM

BACKGROUND OF THE INVENTION

1. Field of the Invention

The present disclosure relates to a management system, and more particularly to a keyword management system.

2. Description of the Prior Art

Keywords and tags are commonly used in web page technology for the purpose of connecting related web pages, so that viewers can browse related web pages quickly. For information search, corresponding web pages or products can also be found by keywords.

At present, most keywords and tags are added artificially, such as "#" commonly found on social networking sites, and how to choose these keywords is mostly determined by the special purpose or experience of the poster. Keywords are commonly used in e-commerce, wherein specific products can be categorized through keywords, the characteristics of the products can be highlighted, and the chance of exposing the product page can be improved.

In e-commerce, the keywords are usually managed by sellers themselves, and the keywords can only be inputted by the seller adding or modifying product pages directly, and there is no window for unified management, and the product pages need to be modified one by one when adding and deleting keywords, and thus consuming much time and manpower.

Therefore, how to solve the aforementioned problem is worthy of consideration by persons having ordinary skills in the art.

SUMMARY OF THE INVENTION

In view of the aforementioned drawbacks, this disclosure provides a keyword management system with a keyword management window provided for users to manage the keywords associated with each web page, which significantly reduces the time and manpower of managing the keywords, and its technical characteristics are described below:

A keyword management system includes at least a user device and a server host. The user device is provided for inputting at least one web page information, at least one whitelist information and at least one blacklist information. The server host is telecommunicatively connected to the user device and includes a word parsing module, a keyword database and a front-end module. The word parsing module is provided for receiving the web page information and capturing a plurality of keyword data from the web page information. The keyword database is provided for storing the keyword data, and these keyword data are associated with the web page information and include a whitelist and a blacklist, and the whitelist includes a plurality of keyword data, and the blacklist also includes a plurality of keyword data. The front-end module is provided for generating a web page according to the web page information, the keyword data, the whitelist and the blacklist. Wherein, the keyword data included in the blacklist will not be displayed on the web page. Wherein, the keyword database writes the keyword data into the whitelist according to the whitelist information, and the keyword database writes the keyword data into the blacklist according to the blacklist information.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
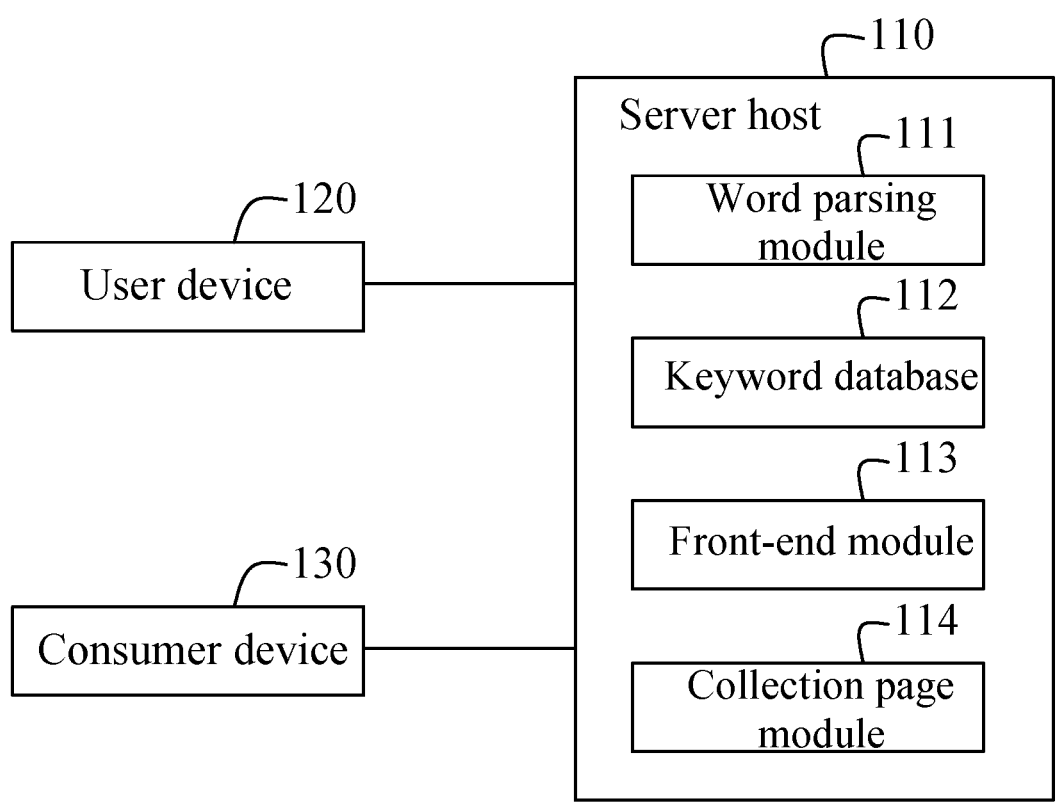
FIG. 1 is a schematic system architecture diagram of a keyword management system of this disclosure.

With reference to FIG. 1 for a schematic system architecture diagram of a keyword management system of this disclosure, the keyword management system 100 includes a user device 120, a server host 110 and a consumer device 130. Wherein, the server host 110 is telecommunicatively connected to the user device 120 and the consumer device 130.

The user device 120 is a device used by users (such as e-commerce sellers or product web page administrators), which can be a smartphone or a personal computer. The user device 120 is provided for inputting at least one web page information, at least one whitelist information and at least one blacklist information. In other words, The users can operate the user device 120 to input web page information, whitelist information and blacklist information. Wherein, the web page information is the information of the created web page, such as the information on product name, product description and program codes that form the web page. The whitelist information is the keyword that users expect to be displayed, and the blacklist information is the keyword that users do not expect to be displayed.

The consumer device 130 is a device used by consumers (such as buyers), which can be a smartphone or a personal computer. In addition, the consumer device 130 is applicable to be connected to the server host 120, for displaying the web page generated by a front-end module 113 of the server host 120 and a collection page generated by the collection page module 114.

The server host 110 is a main computing device of the keyword management system 100, which can be used for the operation by a single server or for the joint operation by a plurality of servers. The server host 110 includes a word parsing module 111, a keyword database 112, a front-end module 113 and a collection page module 114.

The word parsing module 111 is provided for receiving the web page information and capturing a plurality of keyword data from the web page information. Wherein, the word parsing module 111 receives the web page information from the user device 120, but this disclosure is not limited to such arrangement. In an embodiment, the word parsing module 111 can also capture the web page information from an external web server. Further, the word parsing module 111 analyzes the words such as the product name, the product description, etc. in the web page information by a word recognition technology and then sub-divides the words into the corresponding keywords. For example, "OO branded wallet is on sale" will be recognized and sub-divided into the keywords "OO brand", "wallet", "on sale," etc. and these keywords are the keywords indicating the product classification or the keywords that concerns the consumers.

The keyword database 112 is provided for storing the keyword data, and these keyword data are associated with the web page information. In other words, each web page information includes a plurality of corresponding keyword data. For example, the aforementioned "OO branded wallet" is associated with the keywords "OO brand", "wallet", "on sale", etc.

Further, the keyword database 112 further includes a whitelist and a blacklist. The whitelist and blacklist separately include a plurality of keyword data. In other words, individual keyword datum will be written into the whitelist or blacklist, and the whitelist and blacklist will be used as a basis for displaying the web page. In an embodiment, the keyword database 112 writes the keyword data into the whitelist or blacklist according to the whitelist information and the blacklist information from the user device 120. Specifically, the keyword data contained in the whitelist information will be written into the whitelist. On the contrary, the keyword data contained in the blacklist information will be written into the blacklist.

The front-end module 113 is provided for displaying a web page according to the web page information, the keyword data, the whitelist and the blacklist. In other words, the front-end module 113 uses the web page information and the keyword data to form a web page, and the web page is the page displayed to the consumers from the consumer device 130. When the web page is formed, the front-end module will select the keyword data according to the whitelist and the blacklist. Specifically, only the keyword data associated with the web page information or recorded in the whitelist will be displayed on the web page. On the contrary, the keyword data recorded in the blacklist will not be displayed on the web page.

In an embodiment, when the front-end module 113 forms the web page, at least two keyword data are selected from the whitelist and combined with each other to generate a plurality of compound keyword data. For example, the keywords "wallet" and "on sale" (if not written into the blacklist) will be combined with each other to generate a keyword data "wallet on sale". The generated compound keyword data will be displayed on the formed web page.

In another embodiment, in addition to forming the web page according to the corresponding keyword data of the whitelist and the web page information, the front-end module 113 can also select appropriate keyword data according to consumer behavior data corresponding to each keyword datum as the additional keywords displayed on the web page, or form the compound keyword data. Wherein, the consumer behavior information include consumers' webpage browsing history, and consumer's behavior before and after browsing the web page, which are used to determine the consumers' behavior and select the appropriate keyword according to the consumers' behavior. For example, after a consumer clicks the keyword to link to a check-out page to generate consumption, such keyword is an appropriate keyword. In addition, at most six additional keywords can be displayed.

The collection page module 114 is provided for generating a collection page according to the web page information associated with the keyword data, and the collection page includes a plurality of website links corresponding to the web page information. In other words, the collection page module 114 selects the specific keyword data, and finds out all web page information associated with the keyword data to form the collection page, and the website link are these corresponding web page information. For example, the collection page generated by the selected keyword "OO brand" includes the web page information associated with the "OO brand".

Figure 2:
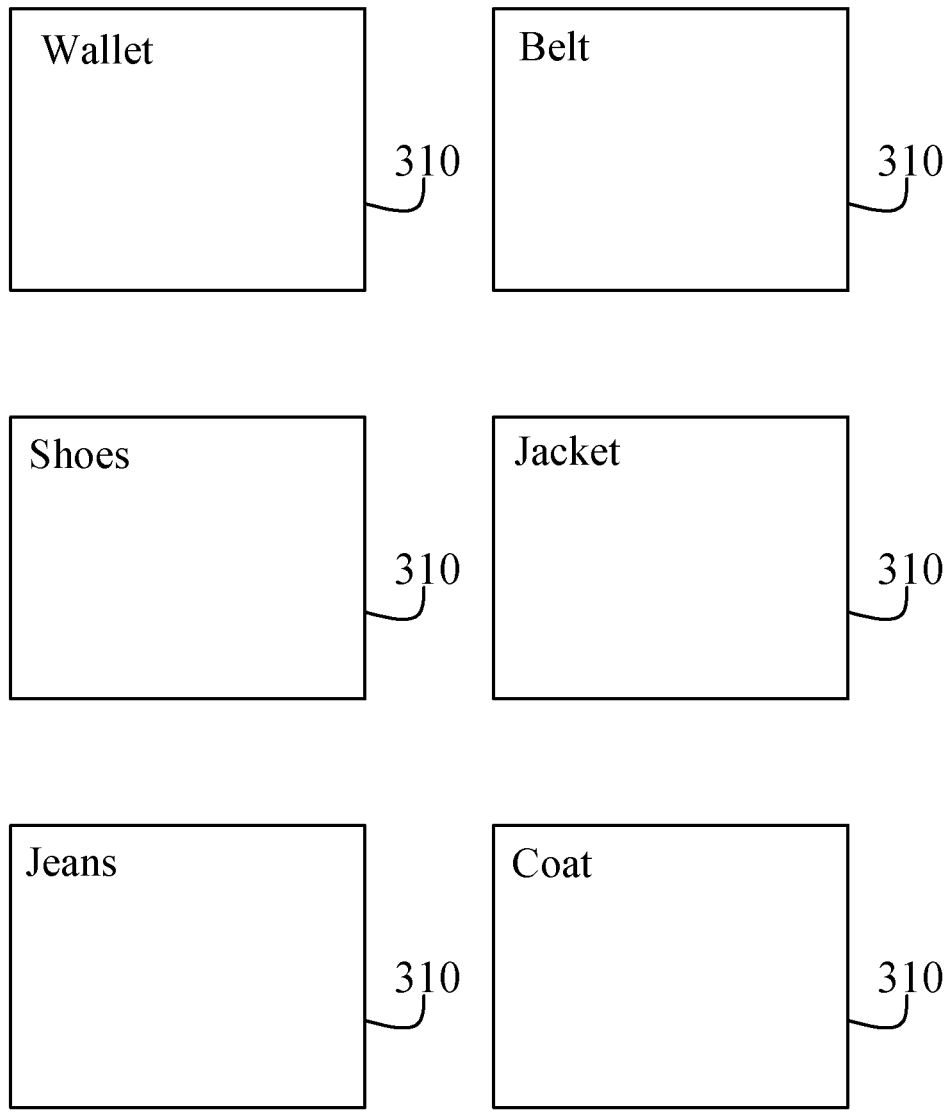
FIG. 2 is a schematic view of a collection page.

With reference to FIG. 2 for the schematic view of a collection page, after the keyword "OO brand" has been selected, the collection page 300 as shown in FIG. 2 will be generated, and the collection page 300 includes a plurality of link icons 310, and these link icons 310 correspond to different web page information, and are the web page information associated with the keyword "OO brand", such as OO branded wallet, belt, and related product pages.

Figure 3:
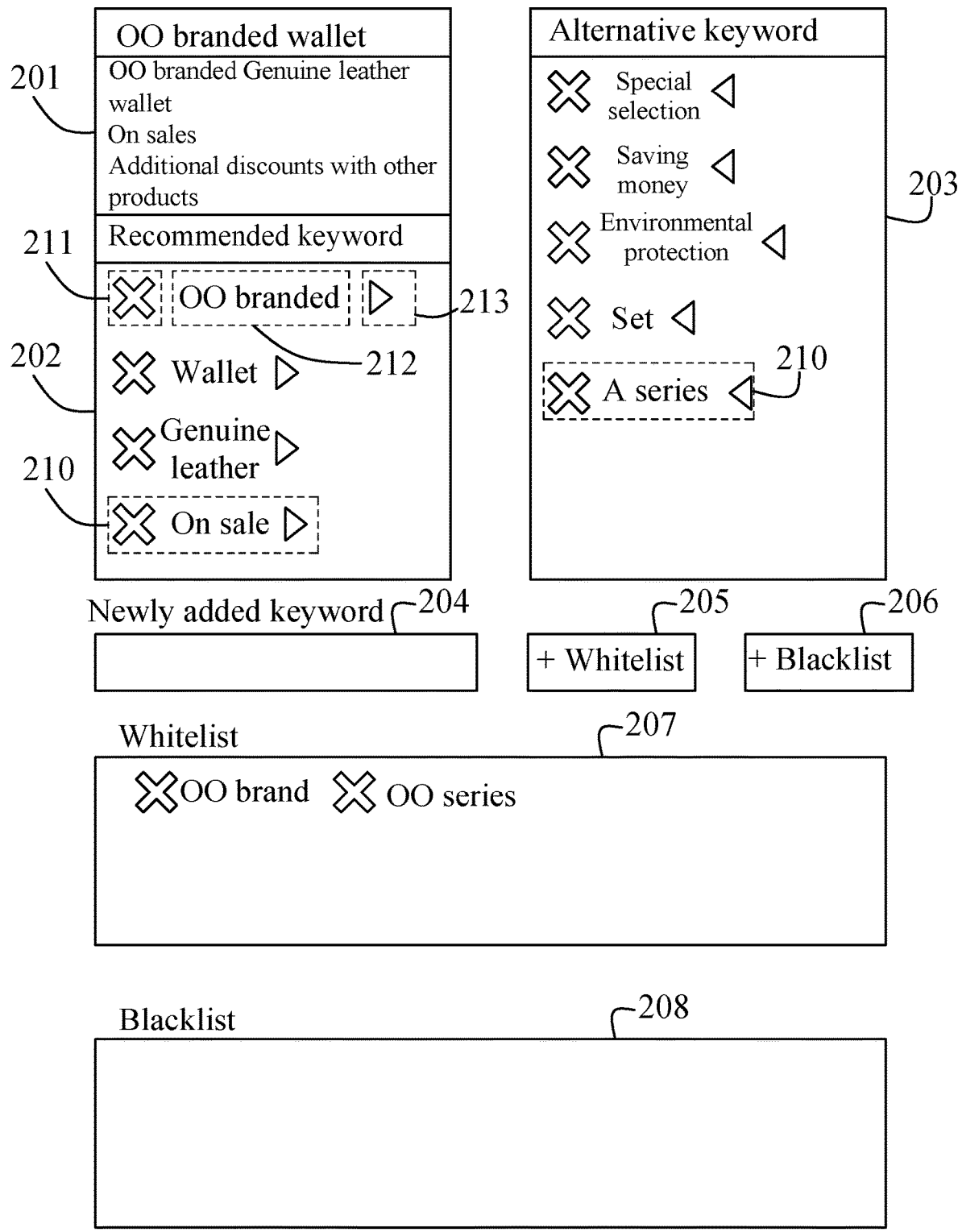
FIG. 3 is a schematic view of an operating interface of a user device.

With reference to FIG. 3 for the schematic view of an operating interface of a user device, the server host 110 of an embodiment provides an operating interface 200, and the user device 120 is connected to the server host 110 for displaying the operating interface 200 provided for the operation by users. The operating interface further includes a web page information field 201, a recommended keyword field 202, an alternative keyword field 203, a keyword input field 204, a whitelist button 205, a blacklist button 206, a whitelist field 207 and a blacklist field 208.

In an embodiment as shown in FIG. 3, only one web page information field 201, one recommended keyword field 202 and one alternative keyword field 203 are drawn in order to clearly show the operating interface 200. However, this disclosure is not just limited to such arrangement only, and there may be a plurality of web page information fields 201, a plurality of recommended keyword fields 202 and a plurality of alternative keyword fields 203 provided for simultaneously displaying a plurality of web page information and their corresponding keywords for users to manage them all at a time.

The web page information field 201 is provided for inputting and displaying the corresponding web page information, the web page information inputted from the user device 120 or the web page information read from the external web server. The recommended keyword field 202 shows a plurality of keywords 210, and these keywords are the keyword data generated by the word parsing module 110. The alternative keyword field 203 shows a plurality of keywords 210, and the keyword 210 in the alternative keyword field 203 is the keyword 210 related to the web page information. Wherein, the keyword 210 in the alternative keyword field 203 is provided by the keyword database 120.

Each keyword 210 includes a delete icon 211, a keyword typeface 212 and a toggle icon 213. When the delete icon 211 is clicked, the corresponding keyword 210 will be moved to the blacklist field 208 below. At this time, clicking the delete icon 211 is equivalent to inputting the blacklist information, and the keyword 210 entered into the blacklist field 208 is equivalent to the corresponding keyword data written into the blacklist.

The keyword typeface 212 shows the content of the keyword itself. After the toggle icon 213 is clicked, the keyword 210 will be moved between the recommended keyword field 202 and the alternative keyword fields 203, showing the keyword data selected and the keyword data associated with the web page information. Further, the keyword 210 in the recommended keyword field 202 is the keyword data associated with the web page information. Therefore, the users can click the toggle icon 213 to select the keyword 210 corresponding to the web page information.

The keyword input field 204 is provided for inputting the keyword 210. After clicking the whitelist button 205, we can add the keyword 210 entered into the keyword input field 204 into the whitelist field 207. On the contrary, clicking the blacklist button 206 will add the keyword 210 entered into the keyword input field 204 into the blacklist field 208. In other words, the users can enter a specific keyword into the keyword input field 204 manually and enter the keyword into the blacklist or the whitelist, in addition to the keyword data provided by the word parsing module 110 and the keyword database 120, so as to define the keyword that the users expect to display and not to display.

Therefore, the users can operate the operating interface 200 from the user device 120 and adjust the keyword 210 associated with the web page information on the operating interface. In this way, the keyword 210 can also be written into the whitelist or blacklist on the operating interface 200.

The keyword management system 100 of this disclosure provides a management window to let users manage keywords corresponding to different web page information all at a time, and use the mechanism of the whitelist and blacklist to control whether or not to display different keywords. With the whitelist, high value keywords such as more attractive keywords or keywords with a higher click through rate are allowed to be displayed. On the contrary, with the blacklist, low value keywords such as those unfavorable for products are hidden. In this way, the keywords corresponding to different web page information can be managed more conveniently, and thus reducing the time and manpower required for adjusting the keywords of a website While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A keyword management system, comprising:
   at least one user device, applicable for inputting at least one web page information, at least one whitelist information and at least one blacklist information; and
   a server host, telecommunicatively coupled to the user device, and the server host comprising:
   a word parsing module, applicable for receiving the web page information, and capturing a plurality of keyword data from the web page information;
   a keyword database, applicable for storing the keyword data associated with the web page information, and the keyword database further comprising a whitelist and a blacklist, and the whitelist comprising a plurality of keyword data, and the blacklist comprising a plurality of keyword data; and
   a front-end module, applicable for generating a web page according to the web page information, the keyword data, the whitelist and the blacklist;
   wherein the front-end module selectively displays the keyword data on the web page based on the whitelist and the blacklist, such that keyword data included in the whitelist are displayed on the web page, and keyword data included in the blacklist are suppressed from display on the web page;
   wherein, the keyword database will write the keyword data into the whitelist according to the whitelist information, and the keyword database will write the keyword data into the blacklist according to the blacklist information.

2. The keyword management system according to claim 1, further comprising a consumer device telecommunicatively coupled to the server host, and applicable for displaying the web page.

3. The keyword management system according to claim 1, wherein the front-end module is further applicable for selecting at least two of the keyword data, generating a plurality of compound keyword data, and displaying the compound keyword data on the web page.

4. The keyword management system according to claim 1, wherein the server host further comprises a collection page module, for generating a collection page according to the web page information associated with the keyword data, and the collection page comprises a plurality of website connections corresponding to the web page information.

5. The keyword management system according to claim 1, wherein the server host receives the web page information through an external web server.

6. The keyword management system according to claim 1, wherein the front-end module is further applicable for selecting a plurality of additional keywords to be displayed on the web page.

* * * * *